(12) United States Patent
Sharon et al.

(10) Patent No.: US 10,117,044 B2
(45) Date of Patent: Oct. 30, 2018

(54) SHARING OF LOCATION-BASED CONTENT ITEM IN SOCIAL NETWORKING SERVICE

(71) Applicant: Facebook, Inc., Menlo Park, CA (US)

(72) Inventors: Eyal M. Sharon, San Francisco, CA (US); Jed Stremel, Burlingame, CA (US); Olumakinde A. Adeagbo, Palo Alto, CA (US); Wayne Chang, Palo Alto, CA (US); Joseph Hewitt, Santa Cruz, CA (US); Matthew Cahill, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/800,407

(22) Filed: Jul. 15, 2015

(65) Prior Publication Data

US 2015/0319590 A1    Nov. 5, 2015

Related U.S. Application Data

(63) Continuation of application No. 12/574,614, filed on Oct. 6, 2009, now Pat. No. 9,119,027.

(51) Int. Cl.
| | |
|---|---|
| *G06F 17/30* | (2006.01) |
| *H04W 4/02* | (2018.01) |
| *H04W 4/21* | (2018.01) |
| *G06F 21/62* | (2013.01) |
| *G06Q 30/02* | (2012.01) |
| *H04W 4/18* | (2009.01) |
| *H04L 29/08* | (2006.01) |
| *G06Q 50/00* | (2012.01) |
| *H04L 29/06* | (2006.01) |

(52) U.S. Cl.
CPC .......... *H04W 4/02* (2013.01); *G06F 21/6245* (2013.01); *G06Q 30/02* (2013.01); *H04L 67/18* (2013.01); *H04L 67/22* (2013.01); *H04W 4/185* (2013.01); *H04W 4/21* (2018.02); *G06F 2221/2111* (2013.01); *G06F 2221/2115* (2013.01); *G06Q 50/01* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 6,275,707 B1 * | 8/2001 | Reed | G01S 5/0072 342/357.31 |
| 6,587,883 B1 | 7/2003 | Rajakarunanayake | |

(Continued)

OTHER PUBLICATIONS

India Patent Office, Examination Report, Indian Patent Application No. 4628/CHENP/2009, dated Nov. 11, 2016, thirteen pages.

*Primary Examiner* — Yongjia Pan
(74) *Attorney, Agent, or Firm* — Fenwick & West LLP

(57) ABSTRACT

A method and/or system allows a user of a social networking service to publish a content item tagged with location information for sharing with other users of the social networking service. The user publishing the content item performs operations on the originating device to generate the content item. The originating communication device attaches the location information to the content item, and transmits the content item to a social networking system. The social networking system may provide various location-based services based on the content item tagged with the location information.

19 Claims, 12 Drawing Sheets

(56) References Cited

U.S. PATENT DOCUMENTS

| | | | |
|---|---|---|---|
| 7,136,747 B2 * | 11/2006 | Raney | G01C 21/20 340/539.12 |
| 7,809,805 B2 | 10/2010 | Stremel et al. | |
| 7,933,810 B2 * | 4/2011 | Morgenstern | G06Q 30/02 705/26.1 |
| 7,958,228 B2 * | 6/2011 | Riise | G06Q 10/00 379/106.02 |
| 7,970,418 B2 * | 6/2011 | Schmidt | H04W 4/023 455/456.1 |
| 7,978,232 B1 * | 7/2011 | Khan | G06F 17/30265 348/116 |
| 7,999,728 B2 * | 8/2011 | Chen | G06Q 30/02 342/357.25 |
| 8,005,911 B2 * | 8/2011 | Jhanji | G06Q 30/0259 709/204 |
| 8,014,943 B2 * | 9/2011 | Jakobson | G01C 21/3682 340/995.21 |
| 8,015,019 B1 | 9/2011 | Smith et al. | |
| 8,131,118 B1 * | 3/2012 | Jing | G01C 21/20 382/305 |
| 8,229,458 B2 * | 7/2012 | Busch | H04W 4/02 370/338 |
| 8,260,553 B2 * | 9/2012 | Klein | G01C 21/20 701/424 |
| 8,290,999 B2 * | 10/2012 | Shepherd | G06Q 10/10 707/728 |
| 8,312,112 B2 | 11/2012 | Stremel et al. | |
| 8,391,617 B2 * | 3/2013 | Yu | G06F 17/30265 382/190 |
| 8,412,780 B2 | 4/2013 | Fox et al. | |
| 8,583,079 B2 * | 11/2013 | Chawla | H04M 3/42357 340/426.19 |
| 8,611,592 B2 * | 12/2013 | Wallace | G06K 9/00704 382/103 |
| 8,621,215 B1 | 12/2013 | Iyer | |
| 8,635,192 B2 * | 1/2014 | Klassen | G06F 17/30241 707/661 |
| 8,719,346 B2 | 5/2014 | Stremel et al. | |
| 8,774,825 B2 * | 7/2014 | Forstall | G01C 21/20 455/456.1 |
| 8,832,132 B1 | 9/2014 | Spertus et al. | |
| 8,930,452 B2 * | 1/2015 | Baalu | G06Q 30/02 709/204 |
| 9,092,827 B2 * | 7/2015 | Stewart | G06Q 50/01 |
| 9,210,118 B2 | 12/2015 | Stremel et al. | |
| 9,338,125 B2 | 5/2016 | Stremel et al. | |
| 9,465,890 B1 * | 10/2016 | Wilson | G06F 17/30241 |
| 9,565,525 B2 | 2/2017 | Stremel et al. | |
| 2003/0126100 A1 * | 7/2003 | Chithambaram | G06N 5/048 706/8 |
| 2003/0212486 A1 * | 11/2003 | Hughes | G08G 1/0104 701/468 |
| 2004/0203896 A1 | 10/2004 | Deigin et al. | |
| 2005/0114014 A1 * | 5/2005 | Isaac | G01C 21/26 701/465 |
| 2005/0190403 A1 | 9/2005 | Nakamura | |
| 2005/0203807 A1 | 9/2005 | Bezos et al. | |
| 2006/0079249 A1 | 4/2006 | Shim | |
| 2006/0085419 A1 | 4/2006 | Rosen | |
| 2006/0161919 A1 | 7/2006 | Onufryk et al. | |
| 2006/0246920 A1 | 11/2006 | Shim | |
| 2006/0256008 A1 | 11/2006 | Rosenberg | |
| 2006/0258368 A1 * | 11/2006 | Granito | G01C 21/00 455/456.1 |
| 2007/0032244 A1 * | 2/2007 | Counts | H04W 8/14 455/456.1 |
| 2007/0255807 A1 * | 11/2007 | Hayashi | H04L 12/58 709/219 |
| 2007/0266423 A1 | 11/2007 | Tehee | |
| 2007/0281689 A1 | 12/2007 | Altman et al. | |
| 2007/0281690 A1 | 12/2007 | Altman et al. | |
| 2007/0281716 A1 | 12/2007 | Altman et al. | |
| 2008/0070593 A1 * | 3/2008 | Altman | H04L 63/102 455/457 |
| 2008/0091723 A1 * | 4/2008 | Zuckerberg | G06F 17/30265 |
| 2008/0102856 A1 * | 5/2008 | Fortescue | G06Q 30/02 455/456.1 |
| 2008/0119160 A1 | 5/2008 | Andriantsiferana et al. | |
| 2008/0248815 A1 * | 10/2008 | Busch | H04W 4/02 455/456.5 |
| 2008/0252527 A1 * | 10/2008 | Garcia | G01S 1/68 342/450 |
| 2009/0054043 A1 * | 2/2009 | Hamilton | G01S 5/0284 455/414.2 |
| 2009/0065578 A1 * | 3/2009 | Peterson | G05B 19/048 235/382 |
| 2009/0144392 A1 * | 6/2009 | Wang | G06Q 10/10 709/217 |
| 2009/0164574 A1 * | 6/2009 | Hoffman | H04W 4/02 709/204 |
| 2009/0189811 A1 * | 7/2009 | Tysowski | G01S 19/14 342/357.34 |
| 2009/0292464 A1 * | 11/2009 | Fuchs | G06Q 10/087 701/532 |
| 2009/0300525 A1 * | 12/2009 | Jolliff | H04M 1/72544 715/764 |
| 2009/0319616 A1 * | 12/2009 | Lewis, II | H04W 24/00 709/206 |
| 2010/0046842 A1 * | 2/2010 | Conwell | G06F 17/30265 382/218 |
| 2010/0082247 A1 * | 4/2010 | Klein | G01C 21/20 701/533 |
| 2010/0127921 A1 * | 5/2010 | Chen | G06Q 30/02 705/319 |
| 2010/0225469 A1 * | 9/2010 | Yoshioka | G08B 21/0233 340/539.13 |
| 2010/0318571 A1 * | 12/2010 | Pearlman | H04L 63/104 707/784 |
| 2011/0029474 A1 * | 2/2011 | Lin | G06N 5/04 706/50 |
| 2011/0046878 A1 * | 2/2011 | Sung | G01C 21/28 701/467 |
| 2011/0047463 A1 * | 2/2011 | Shepherd | G06Q 10/10 715/723 |
| 2011/0047471 A1 * | 2/2011 | Lord | G06Q 10/10 715/739 |
| 2013/0013689 A1 * | 1/2013 | Crawford | H04L 67/24 709/204 |

\* cited by examiner

FIG. 7B

SHARING OF LOCATION-BASED CONTENT ITEM IN SOCIAL NETWORKING SERVICE

CROSS-REFERENCE TO RELATED APPLICATIONS

This application is a continuation application of U.S. patent application Ser. No. 12/574,614 entitled "Sharing of Location-Based Content Item in Social Networking Service," filed on Oct. 6, 2009, which is incorporated by reference herein in its entirety. This application is also related to U.S. patent application Ser. No. 12/485,856 entitled "Selective Content Accessibility in a Social Network," filed on Jun. 16, 2009, which is incorporated by reference herein in its entirety.

BACKGROUND

1. Field of Art

The present invention generally relates to sharing a content item on a social networking service, more specifically to sharing a content item and location information associated with the content item using the social networking service.

2. Background of the Invention

As more computing devices, electronic devices and mobile devices come equipped with the capability to detect the location of the device, more users are using these devices to access various location-based services. The localization technology for detecting the location of the devices is becoming less costly to implement, and thus, contributing to the wide adoption of the technology. As a result, conventional devices such as laptop computers, cell phones, smartphones and PDAs (Personal Digital Assistants) that previously did not implement localization technology are now coming equipped with capability to detect the geographic location of the device.

Widely used location-based services include, among others, identifying businesses or services nearest to the user, locating people on a map, providing turn-by-turn navigation instructions, providing advertisements relevant to the location, and assisting recovery of lost or stolen asset (e.g., stolen car). Some of these location-based techniques use information locally stored on the devices while others require access to information stored on a remote server.

The location of the device may be determined based on a variety of technologies. The most widely used technology for detecting the location is GPS (Global Positioning System). GPS based technology uses radiowave signals transmitted by satellites orbiting around the earth to pinpoint the location of GPS enabled devices. Cell identification is another system used for locating the devices. Cell identification technology uses identification of a telecommunications cell in communication with the mobile device, the signal strength of the communicating cell and its neighboring cells to estimate the location of the mobile device. Although generally less accurate than the GPS technology, cell identification technology estimates the location of the mobile device with reasonable accuracy, especially in urban environments. Other location detection technologies make use of digital broadcast transmitters to locate a device.

Some existing services allow a first user to obtain the location of a second user's GPS enabled mobile device. Generally, the first user must provide a cell phone number of the second user's mobile device to the service, so that the service can identify mobile device, and report its location to the first user. This approach requires the first user to know the cell phone number of each second user that he wishes to track. However, a first user may not know the cell phone numbers of these other users. Further, the first user must manually enter this information to the service, which can be a time consuming, and error prone process.

SUMMARY

Embodiments provide a method, a system and/or a computer readable storage medium for sharing a content item and geographic location information associated with the content item in a social networking service. The social networking service has a plurality of users. A user generates content item at a communication device and makes the content item available to other users of the social networking service. The social networking system obtains geographic location information associated with the content item. The social networking system further selects which other users of the social networking service may access the content item and/or the geographic location information, and makes the content item and/or the geographic location information available to the selected users of the social networking service. The selected users have pre-existing social relationships with the first user in the social networking service.

The geographic location information may be generated at the originating communication device based on user input or localization technology. The geographic location information may be embedded in the content item, and then be sent to the social networking system for sharing.

Where location information is not provided by the originating communication device, geographic location information may be determined or estimated at the social networking system based on at least one of the user inputs received from the originating communication device, information provided by a third party, previous locations of the user or the originating communication device, the content item received from the originating communication device, and/or activities or location of a group of users using the social networking service.

Geographic location information can be provided at various levels of resolution, from high resolution (e.g., an exact street address or latitude/longitude), to medium resolution (e.g., neighborhood), to low resolution (e.g., city or state). The social networking system may vary the resolution of geographic location information provided to recipients, even though these varying levels of location information may pertain to the same content item. For example, high resolution location information (e.g., "Lat. 36° 57.39681' N/Long. 121° 58.25409' W") about a photo of a surf spot may be provided to one recipient, while low resolution location information (e.g., "Santa Cruz") about the surf spot may be provided to a second recipient. The resolution of the geographic location information to be shared with different members may be set accordingly to ensure that the level of information provided to each member is commensurate with the level of trust and reliability of that user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIGS. 7A through 7D are user interfaces displayed on another type of communication device, in accordance with one embodiment.

Figure 1:
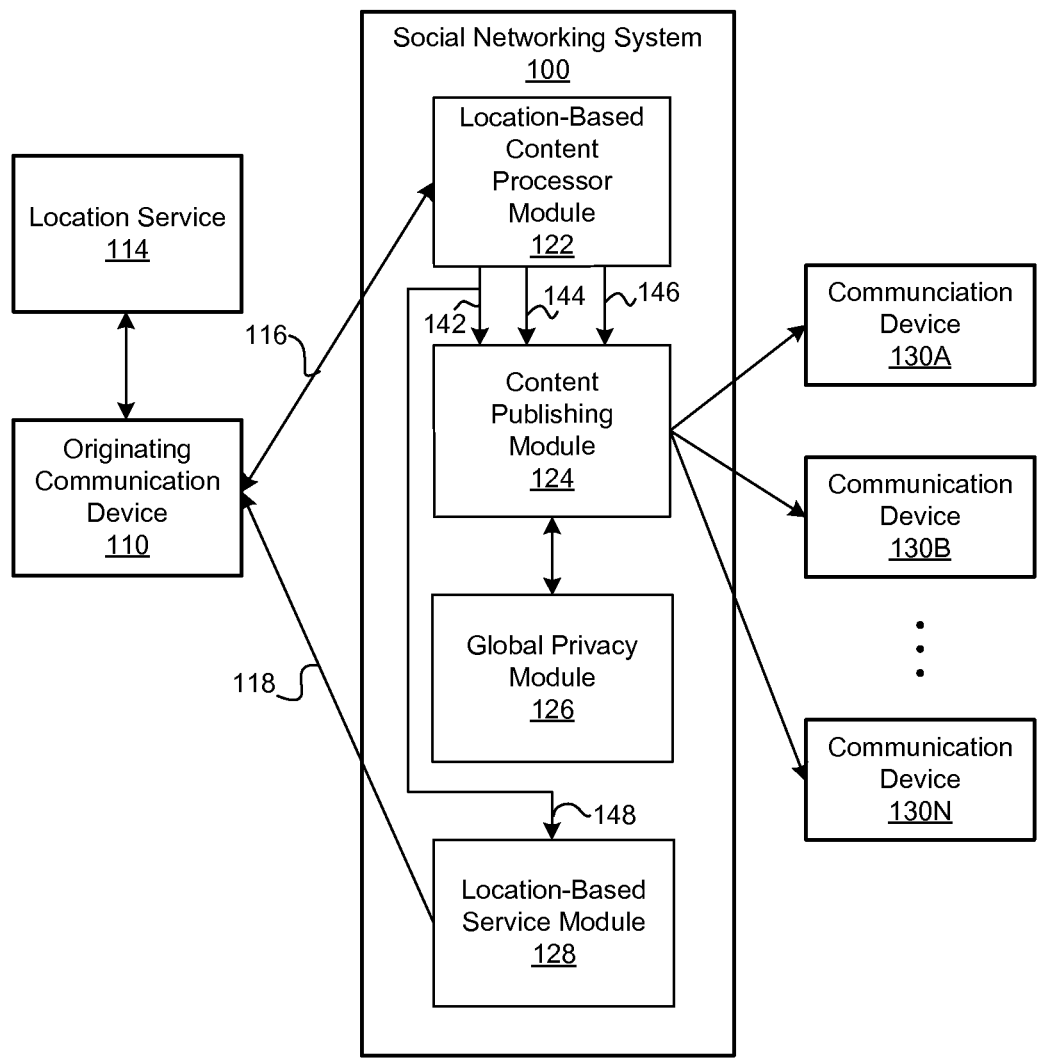
FIG. 1 is a functional block diagram illustrating social networking environment for sharing a location-based content item, in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments provide a method and/or system allowing a user of a social networking service to share a content item and location information of the content item with other users of the social networking service. The content item shared with the other users is created automatically or from user input. After the social networking service receives a content item and associated location information, the social networking service sends, or makes the content item and/or the location information available to selected users. The social networking service determines which users are selected, and the resolution of the location information, based on social relationships between the user and the selected users that are established and managed by the social networking service.

A content item described herein refers to any data that can be shared by a plurality of users through a social networking service. The content item includes, for example, video or audio clips, images, comments, documents, maps, or a status message indicating what a user is doing, interested in or engaged in. These various types of content items are transmitted by the user from the user's originating communication device to the social networking system.

A user described herein may be an individual, a group of individuals, or an entity with one or more associated individuals. If multiple individuals are associated with a user, this user may be assigned multiple login IDs and passwords to allow multiple individuals to access the social networking system under the same user ID. A single user may be assigned a single user profile regardless of whether multiple individuals are associated with the single user.

The geographic location information described herein refers to information indicating a user's geographic location. The geographic location information can include, among others, the longitude and latitude of a location, a street address, or the name of the location. The location associated with content item may refer to the location where the user created the content item or any other location that is associated with the content item. For example, a user can post a photo taken in Troncones, Mexico and associate that photo with location information for Troncones. The association between the content item and the location may be made while the user is at the location or after the user moves to a different location. For example, the photo taken in Troncones may be associated with Troncones while the user is in Troncones or after moving to another location.

A social relationship described herein refers to relationships between users that are established and managed by a social networking service. The social relationship represents affinity or familiarity between users in a social networking service. Users can manually establish social relationships within the social networking service by selecting from a set of existing relationship indicators. The social relationships may be bidirectional (e.g., friends, relatives) or unidirectional (e.g., a fan of another user). The social networking service may also generate social relationships between users automatically based on various criteria including, but not limited to, shared interests and activities between the users, as well as commonality in their social relationships.

System Architecture of Social Networking System

FIG. 1 is a functional block diagram illustrating the environment for a social networking system 100 that implements a social networking service, and in particular that is adapted for sharing a location-based content item, in accordance with one embodiment. The environment includes a user's originating communication device 110, the social networking system 100, and a plurality of users' communication devices 130A through 130N (hereinafter collectively referred to as the "communication devices 130"). The social networking system 100 may optionally include a location service 114 that allows the originating communication device 110 to determine its own location. The originating communication device 110 and the communication devices 130 communicate with the social networking system 100 using various wireless or wired communication methods.

The originating communication device 110 is used by a user who wants to publish content item to the social networking system 100 for sharing with other users of the social networking system. The other users have their own respective communication devices 130. The originating communication device 110 can be any type of communication device that is capable of supporting a communications interface to the system 100. Suitable devices may include, but are not limited to, personal computers, mobile phones, personal navigation devices (PNDs), music players, gaming consoles and devices, handheld computers, personal digital assistants (PDAs), networking devices, cameras, GPS receivers, netbooks and smartphones. The originating communication device 110 is capable of generating content item and associating location information with the content item or sending a message including the location information to the social networking system 120, as described below in detail with reference to FIG. 2. While only a single originating device 110 is shown, in practice there will be a large number (e.g., millions) of such devices in communication with the system 100.

The content item generated at the originating communication device 110 may be any digital information. For example, the content item may include, but is not limited to, the user's status, a text note, a review, an image, a document, a hypertext link, an event, a description of the location, ratings, non-textual messages such as "likes" or "pokes," a map, a list of locations, an animation clip, and an audio/video clip, or other types of user-generated content. Each content item may be associated with location information. The association of location information with a content item may be achieved by tagging or labeling the content item with the location information. For example, a status message may be associated with the location where the message was generated, a photograph may be associated with the location where the photograph was taken, and an audio/video clip may be associated with a number of locations where the audio/video clip was recorded. A content item may also be associated with any location a user believes to be relevant to the content item. However, it is not necessary that location information be related to the content item in any way. For example, a user may be permitted to associate inaccurate location information with a content item.

The location information to be associated with a content item can be obtained using various methods. The following are examples of mechanisms for obtaining location information. A user may input location information directly. Alternatively, the originating communication device 110 may provide location information (or information that can be used to determine location) using any location technology available to a particular device, including, but not limited to, geometric, statistical, scene analysis and proximity based technologies or any combination of these technologies (e.g., GPS, aGPS, WiFi, Cell ID, device headers, http headers, direct API from carriers, handset APIs, Bluetooth, OTDOA, WiMAX, IP address, etc.). Trusted third parties may also provide location information (e.g., mobile carriers, airlines, banks, etc.). The social networking system 100 may provide location information using any technology available to the system for locating users (e.g., user profile information, registration information, IP address geocoding, etc.). Location information originating from a source other than the social networking system itself may be transmitted to the social networking system 100 in the same message as the content item with which it is associated, or in a separate message.

If the originating communication device 110 is incapable of detecting its location or the location information is unavailable for some reason at the originating communication device 110, the originating communication device 110 adds an indication in the content item that the location information associated with the content item is unavailable or sends a separate message indicating the unavailability of the location information. When the location information is unavailable, the location-based content processor module 122 may estimate the location associated with the content item, as described below in detail with reference to FIG. 8.

A communication device 130 is any type of communication device that is capable of supporting a communications interface to the system 100. Such devices may include, among others, personal computers, mobile phones, personal navigation devices (PNDs), music players, gaming consoles and devices, hand held computers, personal digital assistants (PDAs), networking devices, cameras, GPS receivers, netbooks and smartphones. The communication devices 130 receive the content item and the location information associated with the content item from the social networking system 100.

An individual device, such as a computer or a mobile telephone can serve as both an originating communication device 110 and a receiving communication device 130, depending on the particular mode of operation. That is, a user can use a single device as both an originating communication device 110 for sending the content item and location information to the system 100, and as a communication device 130 for receiving the content item and location information from other users.

The social networking system 100 performs functions related to providing a social networking service to a plurality of users. To perform these functions, the social networking system 100 provides one or more communication mechanisms that allow the users to interact and communicate with each other. The communication mechanisms may include, among others, email services, instant messaging services, webpage hosting, application hosting, and photo/video sharing services.

The social networking system 100 may include, among other components, a location-based content processing module 122, a content publishing module 124, a global privacy module 126, and a location-based service module 128. Other modules and functions of the social networking system 100 are well known in the art, and descriptions for these modules and functions are omitted herein for the sake of brevity.

In a simple implementation, the location-based content processor module 122 receives the content item tagged with location information and forwards the content item to the content publishing module 124 without further processing. In a more complex implementation, the location-based content processor module 122 receives the content item tagged with the location information from the originating communication device 110 via a channel 116, extracts the location information associated with the content item, processes the location information and/or infers the location associated with the content item if the received content item is not tagged with location information, and provides the content item 144 and associated processed location information 142 to the content publishing module 124, as described below in detail with reference to FIG. 3.

The content publishing module 124 determines which users may access (or receive) the content item and/or the location information, and makes the content item and/or location information available to the communication devices 130 of such users under the restrictions imposed by the location-based content processor module 122 and the global privacy module 126. The restrictions may include, among others, the posting user's preferences with respect to who may access content item associated with location information and the resolution of that location information, if the location information is to be shared. The content publishing module 124 makes the location information and the content item available to the other users' communication devices 130.

In one embodiment, the content publishing module 124 provides links or other information to allow other users to retrieve the content item and/or location information from a source. In another embodiment, the content publishing module 124 affirmatively transmits the content item and/or location information to other users' communication devices 130, rather than merely making the content item and/or location information available to the users' communication devices 130.

The global privacy module 126 implements policies and rules for sharing a content item received from a user with other users of the social networking system 100 based on social relationships between users. A user having a social relationship with another user is often referred to as a "friend" or "fan." Some social networking systems allow a first user to "follow" or access content items that are posted by a second user with whom the first user has a social relationship. For this purpose, the global privacy module 126 stores global privacy information related to social relationships between users of the social networking system 100. Methods and systems for establishing and managing such social relationships are well known in the art; and therefore, detailed descriptions of such methods and systems are omitted herein for the sake of brevity.

The location-based service module 128 receives the location information 142 determined by the location-based content processor module 122 to provide various location-based services to the user of the originating communication device 110. The location-based services include, for example, navigation services, mapping services, location-based advertisements, and location-based alerts (e.g., traffic jam alert or disaster alert). The location-based services may also include a newsfeed service that provides content items from other users in real-time or near real-time to the originating communication device 110. The provided content items may be filtered by the location of the user of the originating communication device 110.

The location-based service module 128 may also provide location-based search services for searching businesses, points of interests, landmarks, other users and other objects to the content publishing module 110 and/or the communication devices 130. For this purpose, the location-based service module 128 includes a database for storing objects based on their geographic locations. Alternatively, the location-based service module 128 may access other services provided by a third party to provide the search services.

The location-based content processor module 122, the content publishing module 124, the global privacy module 126 and the location-based service module 128 may be implemented as hardware, software, firmware or a combination thereof. Also, two or more of these components may be combined into a single component. The social networking system 100 may also consist of multiple servers, each server providing the same or different functions.

The social networking system 100 may also include a location service 114 that allows determination of the location of the originating communication device 110. The location service 114 may be provided by carriers that provide wired or wireless communication channel to or from the originating communication device 110. For example, the location service 114 is embodied as a system for providing GSM localization or deep level telecoms network (SS7). Alternatively, the location service 114 may be provided by a trusted third party that provides reliable location information of the user. The third party may be the carrier of mobile communication devices. The third party may also be operators of public transport vehicles, vessels or airlines that broadcast wireless information indicating the location of the vehicles, vessels or airlines carrying the user. The originating communication device 110 may receive the location information from the location service 114, and perform calibrations or adjustments to determine its location, if needed.

The location service 114 may also be provided by a mobile device carried by a third party. The third party mobile device may be equipped with a GPS module or other means of localization. The third party mobile device transmits short-range wireless signals (e.g., Bluetooth signal) identifying the location of the third party mobile device to the originating communication device 110. Since the wireless signals from the third party mobile device are received only when in proximity to the third party mobile device, the location of the originating communication device 110 is approximated to the location of the third party mobile device upon receiving the wireless signal from the third party mobile device.

Architecture of Originating Communication Device

Figure 2:
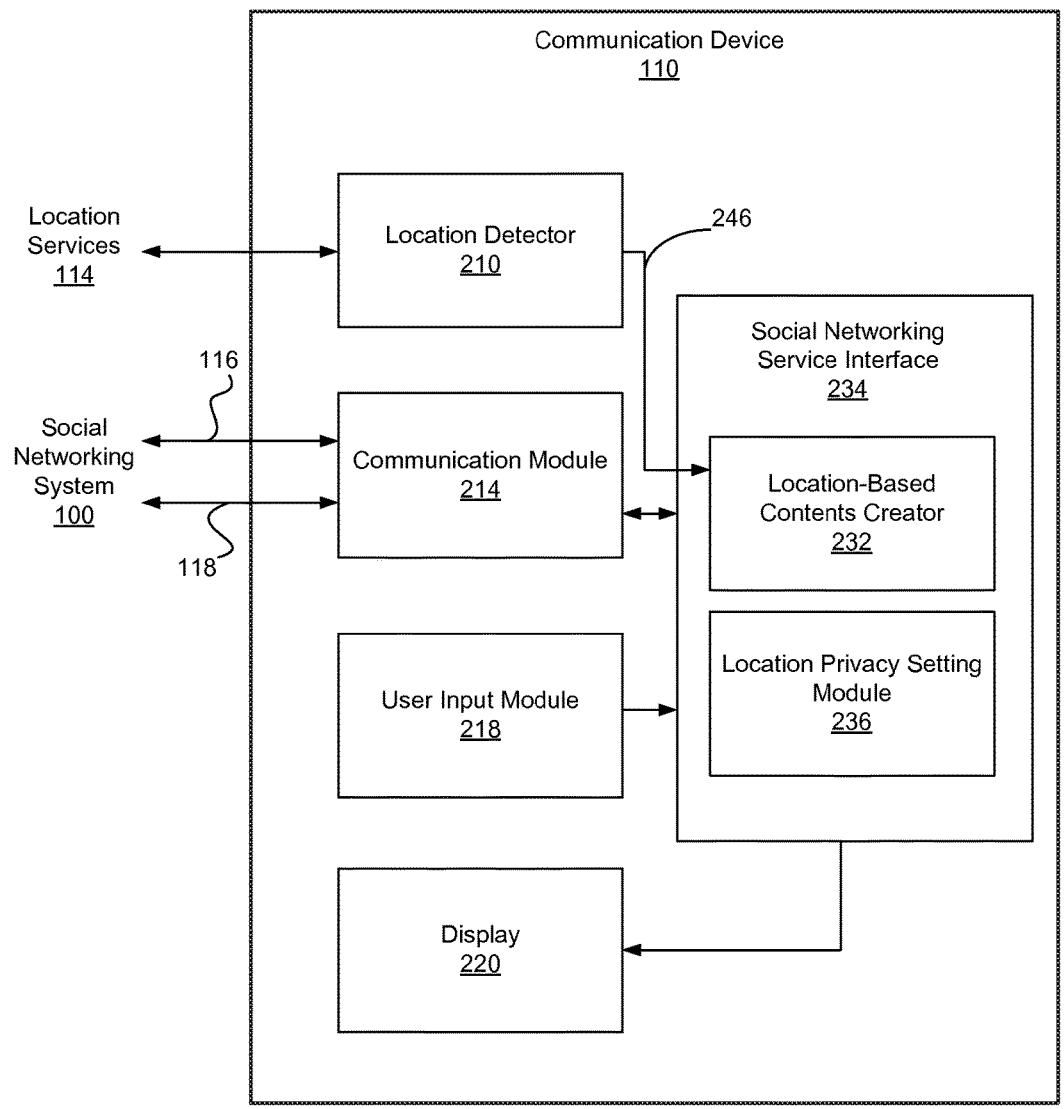
FIG. 2 is a functional block diagram illustrating an originating communication device of FIG. 1, in accordance with one embodiment.

FIG. 2 is a functional block diagram illustrating the originating communication device 110, in accordance with one embodiment. The originating communication device 110 generates a content item based on user input, adds location information to the content item, and sends the content item to the social networking system 100 for sharing. The originating communication device 110 may include, among other components, a location detector 210, a communication module 214, a user input module 218, a display 220 and a social networking service interface 234.

The location detector 210 is hardware, software, firmware or a combination thereof for detecting the location of the originating communication device 110. The location detector 210 embodies localization technology that can be based on geometric, statistical, scene analysis and proximity based technologies or any combination of these technologies (e.g., GPS technology, A-GPS technology, cell locating technology in a cellular system, IP geolocation, WiFi localization technology, and WiMAX localization technology, or other localization technology, to determine the location of the originating communication device 110. Alternatively, the location detector 210 communicates with the location services 114 to identify the location of the originating communication device 110 using localization technologies such as Control Plane location, User Plane location, Secure User Plane Location (SUPL) and telephony signaling protocols (for example, SS7). The location detector 210 provides the location information 246 to the social networking service interface 234. Note that the location detector 210 is not the only source of the location information. That is, the location information may be received from the social networking system 100 based on IP address (or other means available to the system for determining location) of the originating communication device 110 or the location information may be received manually from the user input module 218.

The communication module 214 is hardware, software, firmware or a combination thereof for communicating with the social networking system 100 via channels 116, 118 established using a wired or wireless communication method. Although the location detector 210 is illustrated as a component separate from the communication module 214 in the example of FIG. 2, the location detector 210 may be combined with the communication module 214. For instance, the communication module 214 may approximate the location of the originating communication device 110 by measuring the strengths of wireless signals from radio access stations in a cellular communication system that is also used for establishing the communication channels 116, 118 to the social networking system 100. Further, the communication module 214 may receive the location information (for example, based on IP address of the originating communication device 110) from the social networking system 100 and forward the location information to the social networking service interface 234.

The user input module 218 is hardware, software or a combination thereof for receiving user input from the user. The user input module 218 may comprise, among others, a keypad, a keyboard, a touchscreen or a mouse for performing various operations associated with the social networking service such as receiving a text input identifying the geographic location, or a click indicating the location of the user on a map or selecting the location from a menu. The input location information may be analyzed by the location information processor 314 to determine the location of the user, as described below in detail with reference to FIG. 4. The user input module 218 may also receive user inputs associated with setting of location privacy parameters to set parameters of the privacy setting module 236. The privacy parameters indicate which users may access or receive location information and/or the resolution of the location information to be shared with each user.

The display 220 is an output interface for rendering and displaying user interface screens associated with the social networking service. Examples of user interfaces are described below in detail with reference to FIGS. 6A through 7D.

The social networking service interface 234 is hardware, software, firmware or a combination thereof providing a communication and application programming interface (API) with the social networking system 100 via the communication module 214. Alternatively, a standard web browser may be substituted for a custom API. These interfaces allow access to functions of the social networking service, including, logging into the social networking system 100, communication with the social networking system 100 via communication mechanisms (e.g., instant messages and text messages), uploading content items such as photos, audio, or video files, and setting privacy parameters associated with the content items. The social networking service interface 234 includes, among other components, a location-based content creator 232 and the location privacy setting module 236. The social networking service interface 234 can execute as a standalone application, a web browser with a plugin extension providing the appropriate interfaces, or a standard web browser.

The location-based content creator 232 is responsible for creating a content item to be shared on the social networking service and for adding the location information to the content item. Specifically, the location-based content generator 232 receives, among other data, the content item and the location information associated with the content item. The location-based content creator 232 then generates a location tagged content item by adding the location information as metadata of the content item. Alternatively, the location-based content creator 232 may create a content item and a separate message that indicates the location associated with the content item. The separate message indicating the location associated with the content item may be generated automatically without any user interactions. The location-based content creator 232 may also generate a location tagged content item periodically without user intervention to constantly update the location of the user to be published on the social networking system 100.

The location privacy setting module 236 is responsible for receiving user input and setting various privacy parameters associated with the content item according to user input. The location privacy setting module 236 allows users to set location privacy parameters associated with sharing of the location information independently of global privacy parameters associated with sharing the content item. Specifically, the location privacy setting module 236 receives user input associated with sharing of the location information (in addition to the content item) for other users with whom the user has a social networking relationship. The location privacy setting module 236 may also receive user input concerning the permissible resolution of the location information for particular users.

Alternatively, these settings may also be determined by the social networking system based on information available to the system about the user's relationships with other users. The location privacy setting module 236 generates and sends location privacy parameters to the location privacy module 334 of the location-based content processor module 122 to determine the other users who may access or receive location information and the resolution of the location information the other users may access or receive, as described below in detail with reference to FIG. 3.

The location privacy parameters may indicate that the location information associated with a content item at a city level (e.g., Palo Alto, Calif.) be provided to one group of users while the location information at a street level (e.g., 101 University Avenue, Palo Alto, Calif.) be provided to another group of users. The location privacy setting module 236 may establish which users may share the location information using the technology disclosed, for example, in U.S. patent application Ser. No. 12/485,856 entitled "Selective Content Accessibility in a Social Network," filed on Jun. 16, 2009, which is incorporated herein by reference in its entirety.

Although the location privacy setting module 236 is illustrated in FIG. 2 as being implemented on the originating communication device 110, the location privacy setting module 236 may be implemented on the social networking system 100.

Architecture of Location-Based Content Processor Module

Figure 3:
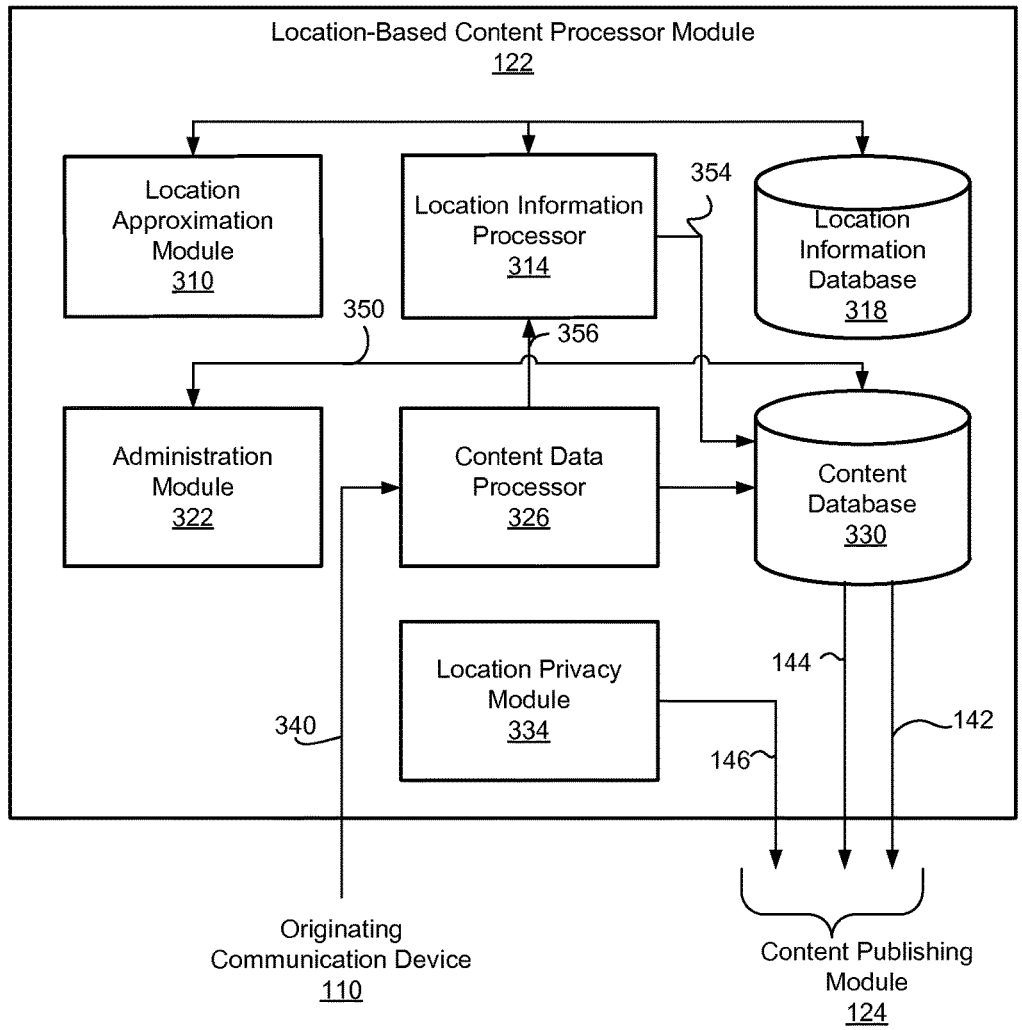
FIG. 3 is a functional block diagram illustrating a location-based content processor module of FIG. 1, in accordance with one embodiment.

FIG. 3 is a functional block diagram illustrating the location-based content processor module 122, in accordance with one embodiment. The location-based content processor module 122 receives the content item tagged with location information from the originating communication device 110, extracts the location information if the location information is included in the content item, determines the location information if the content item does not include the location information, and provides the extracted or determined location information 142 and the content item 144 to the content publishing module 124. To achieve these functions, the location-based content processor module 122 includes, among other components, a location approximation module 310, a location information processor 314, a location information database 318, an administration module 322, a content data processor 326, a content database 330, and a location privacy module 334. One or more of these components, in conjunction with other components, may be implemented in hardware, software, firmware or a combination thereof.

The location approximation module 310 can approximate the location of the originating communication device 110 based on available information, including communication parameters such as the IP (Internet Protocol) address or the phone number associated with the originating communication device 110. The location approximation module 310 receives available information (e.g., an IP address or phone number) from a communication module (not shown) of the social networking system 100 and accesses data stored in the location information database 318 to determine a geographic location associated with information provided. In this way, the location approximation module 310 may approximate the location of the originating communication device 110 without receiving the location information from the originating communication device 110. The approximated location may be used as the location associated with the content item if the location information is not provided by the originating communication device 110 or to present maps relevant to the current location of the user for various locations based services. Further, the approximated location may be sent to the originating communication device 110 for display, as described below in detail with reference to FIG. 7A.

The location information provided by the originating communication device 110 (as embedded in the content item or as included in a separate message) is generally used to indicate the location associated with the content item. However, if the location information is not provided by the originating communication device 110, the location information processor 314 generates the location information indicating a likely location of the user based on available data. The location information 354 generated at the location information processor 314 can be sent to the content database 330 for storing in association with the content item.

The location information database 318 stores data accessible to the location approximation module 310 and/or the location information processor 314 to approximate, infer or predict the location of the originating communication device 110. The data stored in the location information database 318 may include, among others, mapping of IP addresses or phone numbers to geographic locations, data indicating relationships between street addresses and the combination of the longitude and latitude, data related to previous locations of users, user profiles (including user's resident address or office address), and user group information including identity of user groups and their users.

The administration module 322 performs various record keeping operations associated with the location information stored in the content database 330. The record keeping operations may include, among others, indexing the location information, retrieving the location information, editing location information associated with a user or a content item, deleting location information associated with a user upon request, deleting outdated content items and location information, and archiving the content items and location information to a secondary storage device or system.

The content data processor 326 receives a content item 340 from the originating communication device 110. If the received content is tagged with the location information, the content data processor 326 extracts the location information from the content and stores the content and the location information in the content database 330. In order to store the content items efficiently, the content data processor 326 may preprocess (e.g., compress or downscale) the content items before storing in the content database 330.

If the received content item is not tagged with location information, the content data processor 326 sends a signal 356 to the location information processor 314 to generate the location information 354 based on various accessible data, as described below in detail with reference to FIG. 4. The location information 354 from the location information processor 314 and the content item is stored in the content database 330. The location information 354 generated at the location information processor 314 may be presented to the user of the originating communication device 110 for confirmation before storing in the content database 330.

The content data processor 326 may also perform translation of location information received from the originating communication device 110 for storage in the content database 330. The location information may be stored in the content database in various formats, such as the combination of longitude and latitude. The content data processor 326 may convert the location information in other formats (e.g., street address) into a combination of longitude and latitude, and then store the location information in the content database 330. Similarly, the combination of longitude and latitude may be converted into street address and one or both of which may be stored in the content database.

The content database 330 receives and stores the content item and the location information associated with the content item. The content item and the location information stored in the content database 330 may be managed by the administration module 322. The location information 144 and the content item 142 are retrieved by the content publishing module 124 for making available or sending to the communication devices 130.

The location privacy module 334 stores location privacy parameters that control who may access location information associated with a particular content item and/or what level of resolution those entitled to view location information will be permitted to access. The location privacy parameters may be received from the location privacy setting module 236 of the originating communication device 110. The location privacy module 334 may implement policies or rules for automatically setting the privacy parameters for location information associated with a content item.

Specifically, the policies or rules may automatically set the privacy parameters so that content item generated at a certain location or at a certain time are: (i) not shared with other users, (ii) only shared with a predefined group of users or (iii) shared with different groups of users at different levels of resolution (e.g., street level resolution or city level resolution). For example, the location privacy module 334 may implement a policy that the user's location may only be shared between 9:00 a.m. and 5:00 p.m. The location privacy module 334 may implement a policy that location information may not be shared, except for when the user posts a content item within a predefined geographical area. For example, privacy parameters may dictate that location information is only shared about the content item posted when the user in is California, but not if the user leaves the state.

Further, the policies or rules may also set the location privacy parameters so that the location information associated with certain types of content items is shared with other users but not location information associated with other types of content items. The content publishing module 124 receives the location privacy parameters 146 from the location privacy module 334 and determines the users to receive the location information, and the resolution of the location information to be provided to the communication devices 130 of the users. Privacy settings for content items and for location information may be set independent of each other. Hence, even if a user is not permitted to receive location information for a content item, the user may still be permitted to receive the content item itself.

Although the location privacy module 334 is illustrated in FIG. 3 as a component separate from the global privacy module 126, the location privacy module 334 may be implemented as a component of the global privacy module 126. Alternatively, the location privacy module 334 may be a module separate from the location-based content processor module 122. Further, the location privacy module 334 may be a module independent of the location-based content processor module 122 or be combined with other modules in the social networking system 100.

Example of Location Determination

If the originating communication device 110 has the capability to determine its location, the location associated with the content item is received from the originating communication device 110 either as data embedded in the content item or as a message separate from the content item. But if the originating communication device 110 does not have the capability to determine its locations or when a component for determining the location of the originating communication device 110 is not functioning for some reason, the location information associated with the content item may not be provided by the originating communication device 110.

If the social networking system 100 does not receive the location information from the originating communication device 110, the location information processor 314 of the social networking system 100 may predict or infer the current location of the originating communication device 110. In one embodiment, even in circumstances where the originating communication device 110 has the capability to determine its location, the location determined by the originating communication device 110 may be supplemented by other sources of location information to enhance the accuracy of the location information.

Figure 4:
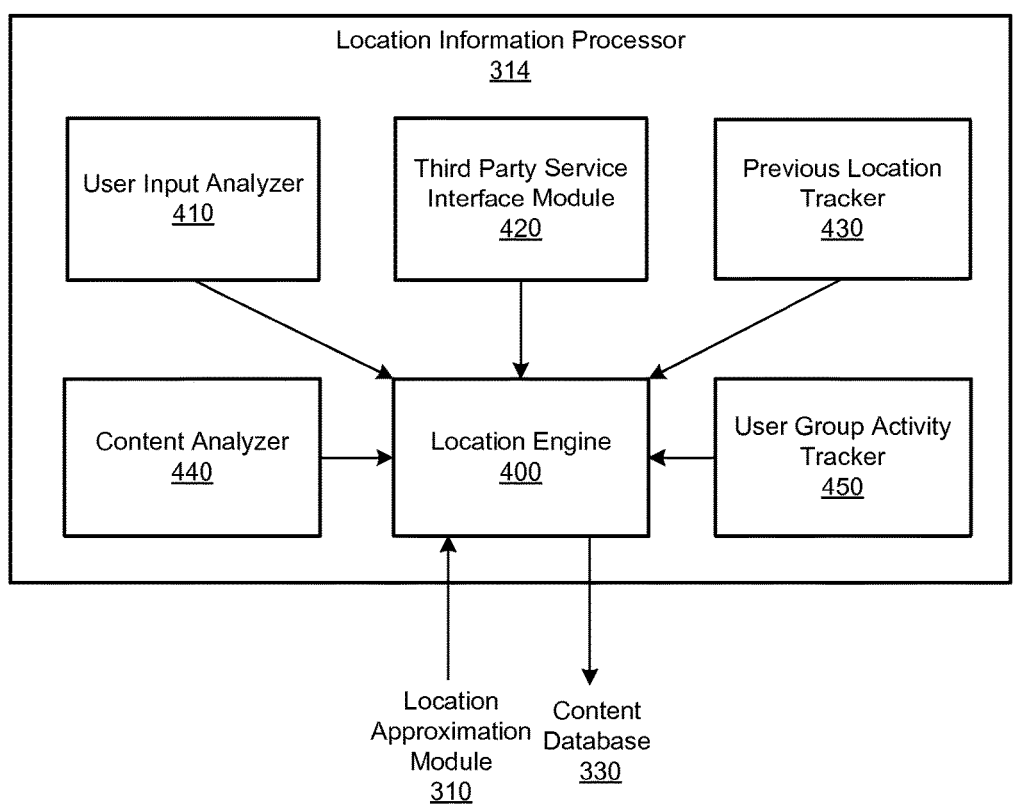
FIG. 4 is a functional block diagram of a location information processor, in accordance with one embodiment.

FIG. 4 is a functional block diagram of the location information processor 314, in accordance with one embodiment. The location information processor 314 may include, among other components, a user input analyzer 410, a third party service interface module 420, a previous location tracker 430, a content analyzer 440, a user group activity tracker 450 and the location engine 400. One or more of these components may be implemented in the originating communication device instead of the social networking system 100.

The user input analyzer 410 receives and analyzes user input received at the originating communication device 110 to determine, predict or infer the location of the originating communication device 110. A user may provide user input indicating the geographic location of the user, such as a combination of the longitude and latitude, the street address of the location, and the name of the business/service (e.g., Home Depot in Cupertino, Calif.). Alternatively, the user may provide input indicating proximity to another user of the social networking service from which the location of the user may be determined. For example, user X of the originating communication device 110 may provide the following user input "I am with Y" indicating that user X is currently at the same location as user Y. If the location of user Y is known, the location of X can also be determined. Conversely, if the location of user X is known but the location of user Y is not known, the location of user Y may be determined from the same user input. Other user inputs indicating relative distance and direction from a user or a geographic location may also be provided to determine a user's location (e.g., "I am 50 yards north of user Y" and "I am one block north of the Empire State Building."). Further, user input may indicate where two or more users of the social networking service are located (e.g., "X and Y are at Bar ABC in Palo Alto.") to allow the social networking system 100 to update the location information for the two or more users. The user input analyzer 410 may detect and infer location automatically based on a parser which would include keywords or phrases such as "at", "with", "near", "in" and their equivalents in all the languages that the system is localized for. In addition, a realtime natural language processing may analyze the phrase for context to provide a greater degree of accuracy in determining the location.

Further, the user input analyzer 410 may determine the location of the user based on user input provided for other purposes. For example, when a user runs an internet search for a certain geographic location or flight from one location to the other, the originating communication device 110 may capture such user input and analyze the user input to infer or predict the location of the user.

The third party service interface module 420 accesses a third party service to obtain information of the user. The third party must be an entity that can provide reliable location information for a user, such as public transport operators, banks or airlines. After receiving user inputs indicating that the user is taking a certain vehicle, vessel or flight to move from one location to another, the third party service interface module 420 may communicate with the third party service to obtain the updated location information of the vehicle, vessel or flight that the user is currently using.

The previous location tracker 430 determines the likely location of the user based on past patterns of user locations. For example, the previous location tracker 430 may predict that any content items received from the user between 9:00 a.m. to 5:00 p.m. originates from an office address if the location information of the user received between 9:00 a.m. to 5:00 p.m. on previous occasions predominantly indicated that the user was at the office address. Various heuristics may also be employed to increase the accuracy of inference or prediction of the location information. Predictive models may use classifiers based on machine learning techniques such as the k-nearest neighbor algorithm or Bayesian classifiers, and information filtering algorithms such as collaborative filtering.

The content analyzer 440 processes the substance of the content item to determine if the content item itself might provide a location associated with the content item. The substance of the content item may be analyzed using various content recognition tools such as visual recognition, OCR (Optical Character Recognition) and speech recognition. For example, the content analyzer 440 may employ an OCR (Optical Character Recognition) technology to read any characters appearing in a photograph or a web document to determine a likely location associated with the content item. As another example, the content analyzer 440 may recognize a unique landmark (e.g., Eifel Tower) appearing in a photograph and associate the photograph with the known location of the landmark. The content analyzer 440 may employ image detection algorithms to identify salient features in the image and matching these features against a database of known points of interest.

The user group activity tracker 450 tracks activities of various groups that the user is associated with and predicts the location of the user based on the activities of such groups. For example, if a large number of users in a group (e.g., high school alumni) send location information indicating congregation at a certain location, the user group activity tracker 450 may predict or infer that other users belonging to the group are also at this location. Further, the user group activity tracker 450 may analyze information made available on the social networking system 100 for members of the group to better predict the location of the user. For example, the user group activity tracker 450 may infer or predict the location of the members of the group based on postings on the webpage of the group or a group-wide email sent to members of a group.

The location engine 400 collects, evaluates, and scores the location predicted or detected by the location approximation module 310, the user input analyzer 410, the third party service interface module 420, the previous location tracker 440, the content analyzer 440 and the user group activity tracker 450. Based on the location predicted or detected from such multiples sources, the location engine 400 determines the most likely location of the user. The location engine 400 may apply various heuristics to determine the most likely location of the user. For example, more weight is given if one or more of the sources indicate that the user is likely to be at a certain location. The predicted or inferred location of the user is provided to the content database 330 for storage with the content item.

Method of Sharing Content Items and Associated Location

Figure 5:
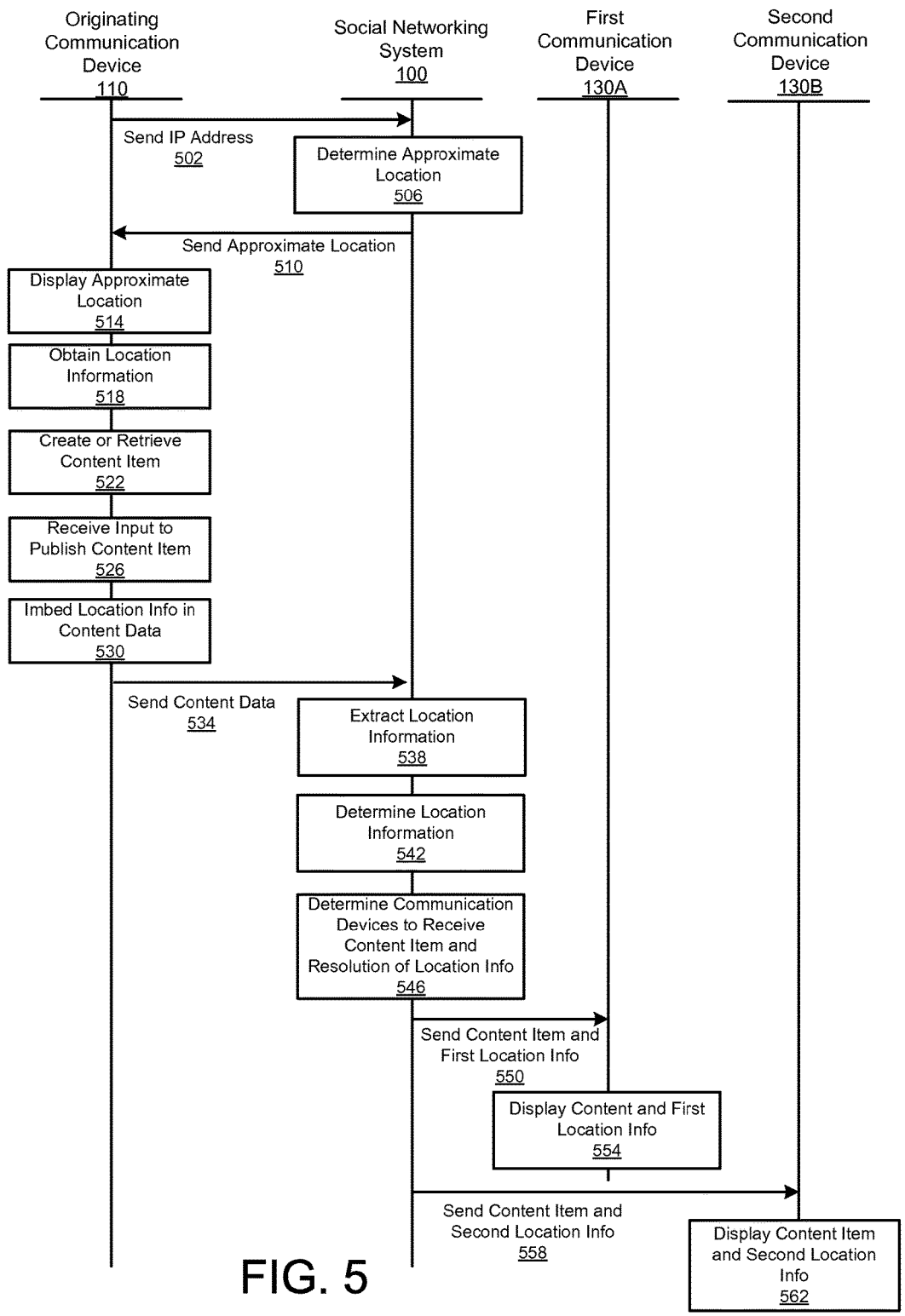
FIG. 5 is an interaction diagram illustrating a process of sharing a location-based content item in the social networking system, in accordance with one embodiment.

FIG. 5 is an interaction diagram illustrating an exemplary process for publishing a content item and associated location information for user, in accordance with one embodiment. First, the location approximation module 310 of the originating communication device 110 sends 502 an IP address to the social networking system 100. Based on the IP address, the social networking system 100 determines 506 the approximate location of the originating communication device 110. Alternatively, the social networking system 100 may detect a phone number or other communication properties associated with the originating communication device 110 to approximate the location of the originating communication device 110. The originating communication device 110 receives the approximate location and displays 530 the approximate location of the originating communication device 110 on the display 220.

Figure 6A:
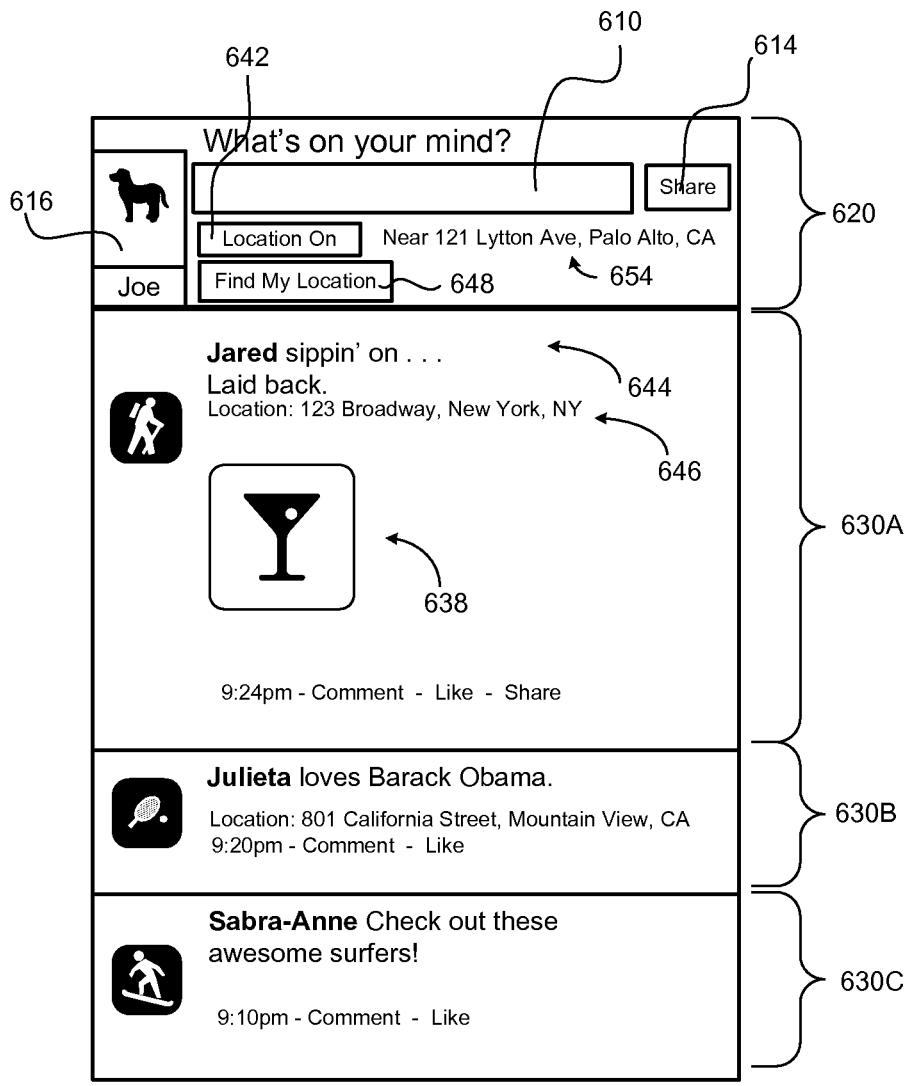
FIGS. 6A and 6B are user interfaces displayed on one type of communication device, in accordance with one embodiment.

Referring to FIG. 6A, a user interface of the originating communication device displaying the approximate location is illustrated. In the example of FIG. 6A, the originating communication device is a smartphone with limited screen space. The user interface includes a content upload section 620 and published content sections 630A through 640C for displaying content items generated and published by the user of the originating communication device or other users of the social networking system 100. The content upload section 620 includes a thumbnail image 616 representing the user of the originating communication device, a text box 610 for receiving content items from the user to be published via the social networking service, and a "share" button for receiving approval from the user to publish the content item and/or the location information.

The content upload section 620 also includes a "location" indicator 642 indicating whether the location feature is activated. When the location feature is activated the originating communication device generates content items tagged with location information. When the location feature is disabled, the originating communication device does not tag the content item with location information. The activation and disabling of the location feature can be toggled by clicking the indicator 642. In the user interface of FIG. 6A, the approximate location of the user "Joe" is displayed as being "Near 121 Lytton Ave., Palo Alto, Calif.". As described above in FIG. 6A, the approximate location is determined by the social networking system 100 based on the IP address or other communication properties of the originating communication device.

Each of the published content sections 630A through 630C includes content items published by the user of the originating communication device or other users. In the example of FIG. 6A, the content item in the content section 630A is a combination of a message 644 and a photograph 638. The location information 646 displays the location of user "Jared" when the message 644 and the photograph 638 were uploaded by user "Jared". Similarly, the content sections 630B and 630C displays content items published by other users "Julieta" and "Sabra-Anne."

Figure 6B:
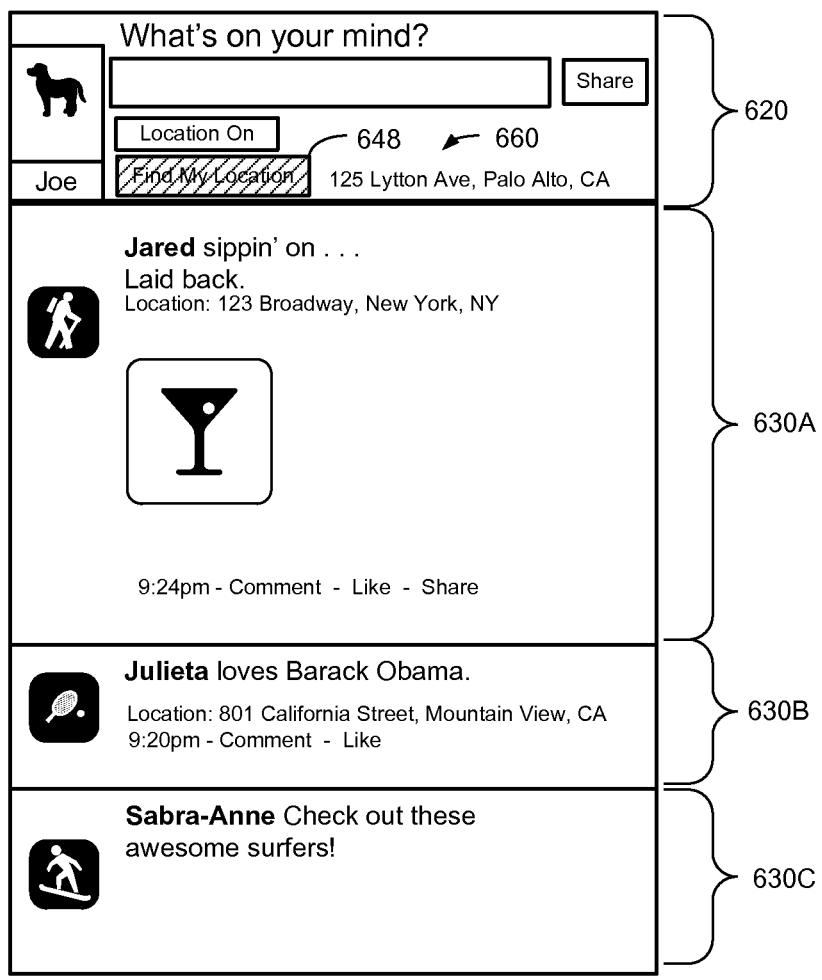

Referring back to FIG. 5, the originating communication device 110 obtains 518 the location information of the originating communication device 110. As described above in detail with reference to FIG. 2, the location information may be obtained by the operation of the location detector 210 or by receiving the user input via the user input module 218. FIG. 6B illustrates the location information being obtained from a GPS system or other locating mechanism after the user clicks the "Find My Location" button 648. The location 660 as determined by the originating communication device 110 is displayed in an area 660 of the user interface as "125 Lytton Ave., Palo Alto, Calif."

Referring back to FIG. 5, the originating communication device 110 then creates or retrieves 522 the content item. The content item may be created or retrieved based on various user interactions such as capturing a photograph using a camera installed on the originating communication device 110, recording audio/video clips using the camera and a microphone, and retrieving data stored in the originating communication device 110. Alternatively, the content item may be created automatically after detecting an event or after elapse of a predetermined amount of time.

The originating communication device 110 receives 526 the user input indicating that the content item may be published. Referring to the example of FIG. 6A, the user input for publishing the content item corresponds to clicking the "share" button 614 on the user interface. Referring back to FIG. 5, the originating communication device 110 imbeds 530 the location information in the content data. The content data is then sent 534 from the originating communication device 110 to the social networking system 100. Alternatively, a separate message indicating the location associated with the content data may be generated at the originating communication device 110 and sent to the social networking system 100 instead of embedding the location information in the content data.

The social networking system 100 extracts 538 the location information from the received content data if the location information is embedded in the content data. If the location information is not available, the social networking system 100 may determine 542 the location associated with the content item using various factors, as described below in detail with reference to FIG. 8. Based on a global privacy setting and the location privacy parameters, the social networking system 100 determines 546 the users who may access or receive the content item, and the resolution of the location information to be sent or made available to each user. Specifically, for a given user, the content publishing module 124 determines the set of other users to access or receive the content item from the user's global privacy parameters stored in the global privacy module. For each user determined to receive the content item, the content publishing module 124 further determines whether a user should receive the location information, and if so, the resolution of the location information based on location privacy parameters 146 and/or the global privacy setting.

After determining the users who may access or receive the content item and the resolution of the location information, the social networking system 100 makes available or sends 550 the content item and first location information to the first communication device 130A of a first user according to the determination. To make this information available, the social networking system 100 can transmit a message (e.g., an SMS message to the first user's telephone or an email) to the first user, or update a home page of the first user.

It should be noted here that a user receives the location information for other users with whom he has a social relationship, without ever having to provide identification information of those other users' communications devices to the social networking system. For example, referring to FIG. 6A, the user Joe receives the location information for other users Jared and Julieta without ever having to manual entire any identification information for these other users' communication device (e.g., their mobile telephone numbers). This makes the location information significantly more available than would otherwise be possible using existing system which imposes this requirement.

Then the first communication device 130A may display 554 the content item and the first location information. The social networking system 100 may also make available or send 558 the content item and location information to the second communication device 130B of a second user. Then the second communication device 130B may display 554 the content item and location information. The resolution of the first location information and the resolution of the second information may be set differently depending on the location privacy setting of the user publishing the content item. For example, the first location information may be provided to a group of friends with a distant relationship (e.g., friends of a friend) to indicate the location at a city level (e.g., Palo Alto, Calif.) while the second location information may be provided to another group of friends with a close relationship (e.g., friends or relatives) to indicate the location at a street level (e.g., 101 University Avenue, Palo Alto, Calif.). The ability to provide location information of different resolutions to different communication devices, allows the user to more finely control the location information shared with other users depending on, for example, the reliability or trustworthiness of the users.

Various modifications can be made to the processes described in FIG. 5. Instead of embedding the location information in the content item at the originating communication device 110, the originating communication device 110 may generate and send a message to the social network system 100 including the location information. Also, the process of sending 502 the IP address, determining 506 the approximate location, sending 510 the approximate location and/or the displaying 514 of the approximate location may be omitted.

Alternative User Interface Example

FIGS. 7A through 7D represent another set of user interfaces displayed on another originating communication device, in accordance with one embodiment. The user interfaces of FIGS. 7A through 7D are similar to the user interfaces of FIGS. 6A and 6B but are more suitable for the originating communication device (e.g., a laptop computer) with a larger screen to display more information. The user interface in FIG. 7A includes a menu bar 704, a content upload section 710, a side menu bar 724 and published content sections 714A through 714C. The menu bar 704 displays menu items of "Settings" and "Logout." The side menu bar 724 includes multiple operations that the user may perform using the social networking service such as viewing a "Newsfeed." In FIG. 7A, the "Newsfeed" is selected by the user to display messages or other content items published by the user and/or other users in the published content sections 714A through 714C. In the "Newsfeed" mode, content items received from the user of the originating communication device 110 and/or other users is prioritized for display based on how recent the content items were published by the users. In other embodiments, content items may be ordered based on other criteria.

The published content section 714A includes a location filtering button 766 that activates or disables filtering operations based on the location. When location filtering is active, the content item displayed in the published content sections 714A through 714C are filtered so that the originating communication device only displays content items tagged with location information indicating locations in proximity to the originating communication device. To filter content items based on proximity, locations may be grouped into multiple geographic grids. Only content items with location information tagged with a location in the same geographic grid as the location of the device requesting the content item are selected and displayed. When the location filtering is disabled, content item from other users is displayed regardless of the location tagged to the content item.

The content upload section 710 allows the user to publish content items on the social networking service. The content uploading section 710 includes a text box 610 for entering text or other content items, a tagging menu 766 allowing the user to select the data to be tagged with the message, and a "Share" button 758 for approving the sharing of content items and/or location information. The tagging menu 766 includes a "location" button, a "link" button, a "photo" button and a "video" button. The "location" button is associated with tagging location information to the message. After the "location" button is clicked, the screen of the originating communication device displays a user interface as illustrated in FIG. 7B. The "link" button, the "photo" button, and the "video" button are associated with adding a hypertext link, an image file or a video clip to the message. The location button may also function as a switch, displaying the user interface as illustrated in FIG. 7B when the user focuses the interface on the content upload section.

FIG. 7B is a user interface displayed on the originating communication device after the user selects a location for tagging in a message in the text box 754. After the user clicks the "location" button, a location text box 768 is displayed to allow the user to type in the location associated with the message. Then the user may find the typed in location on a map by clicking a "Find on Map" button 776.

Figure 7A:
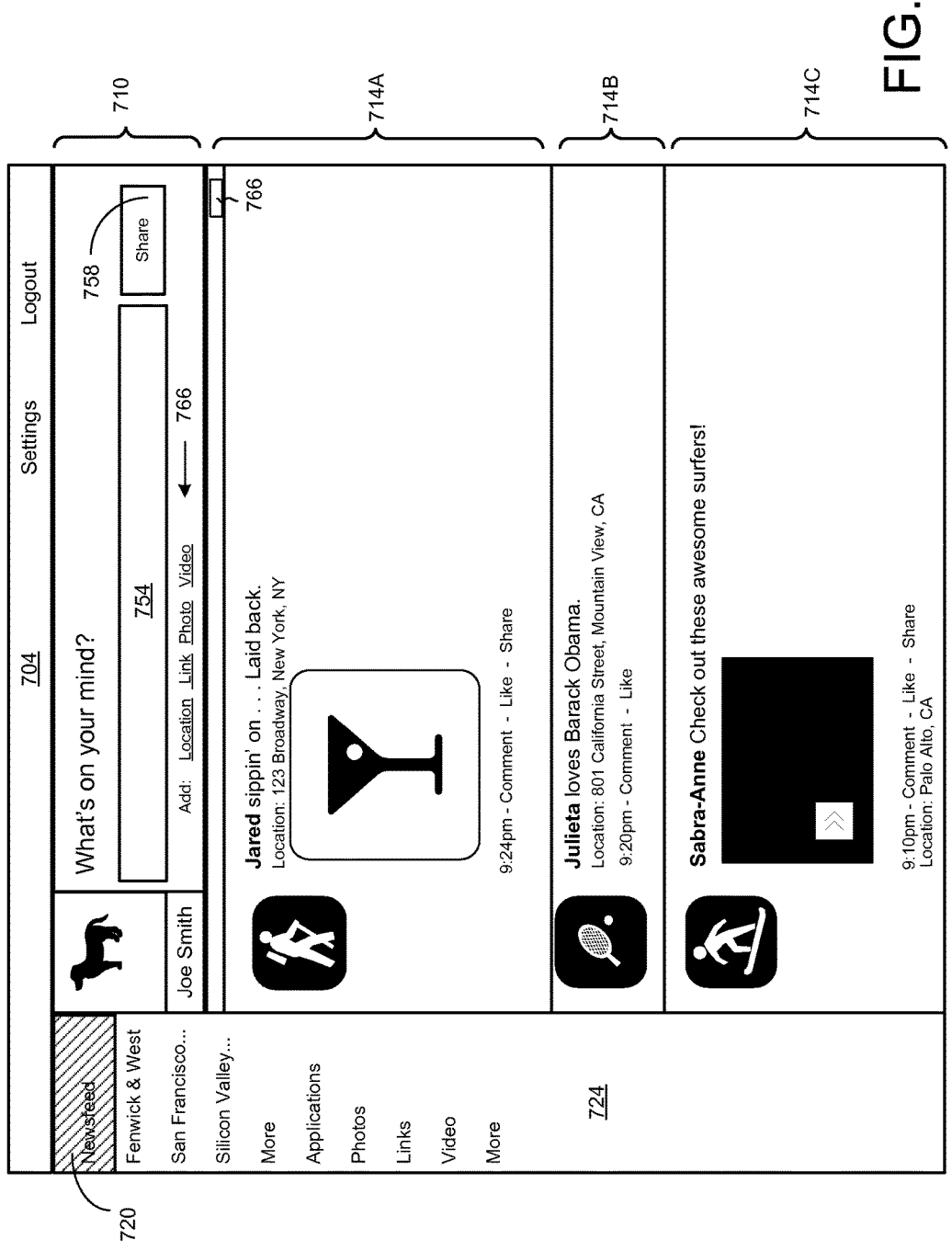
Figure 7B:
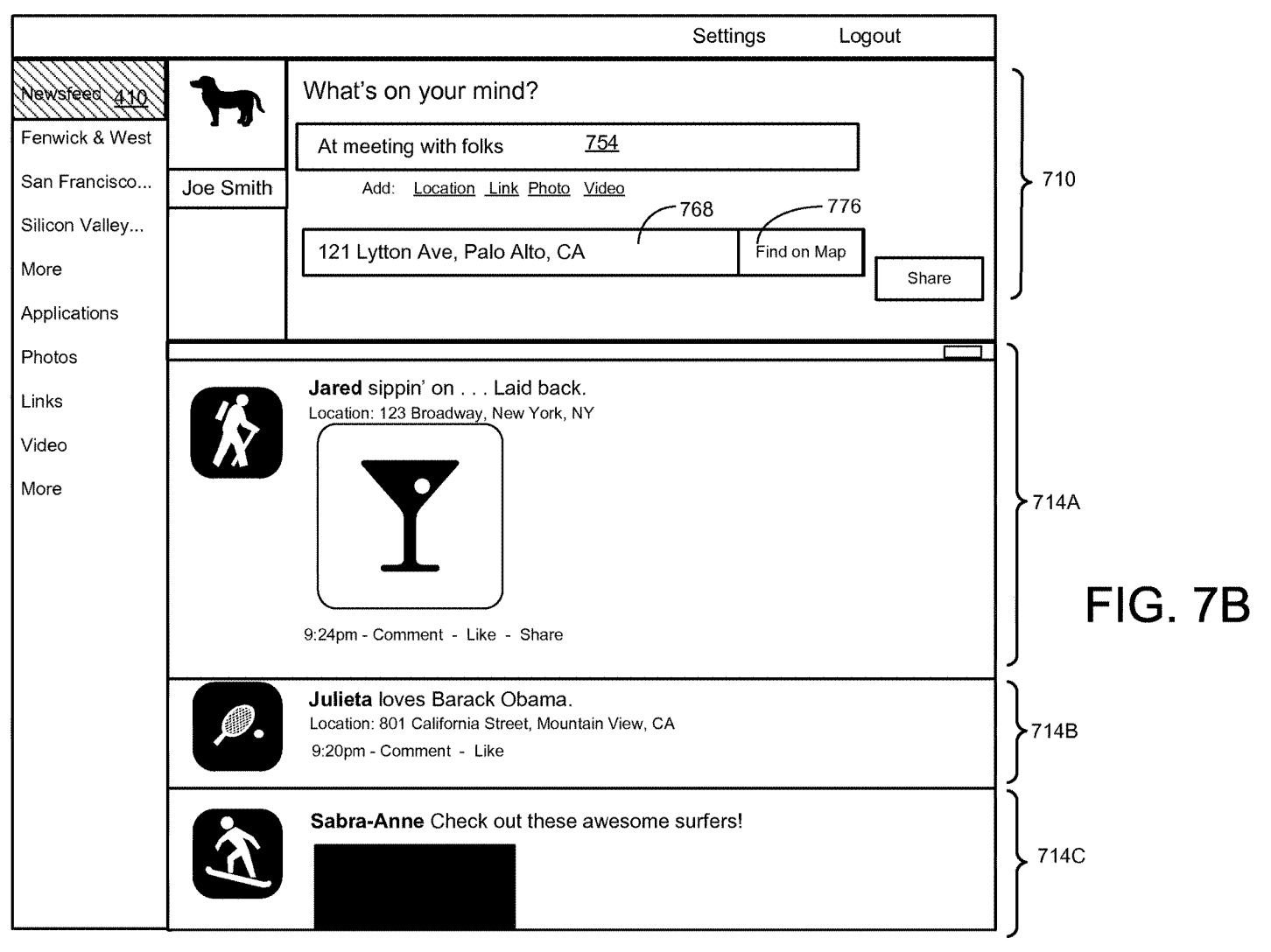
Figure 7C:
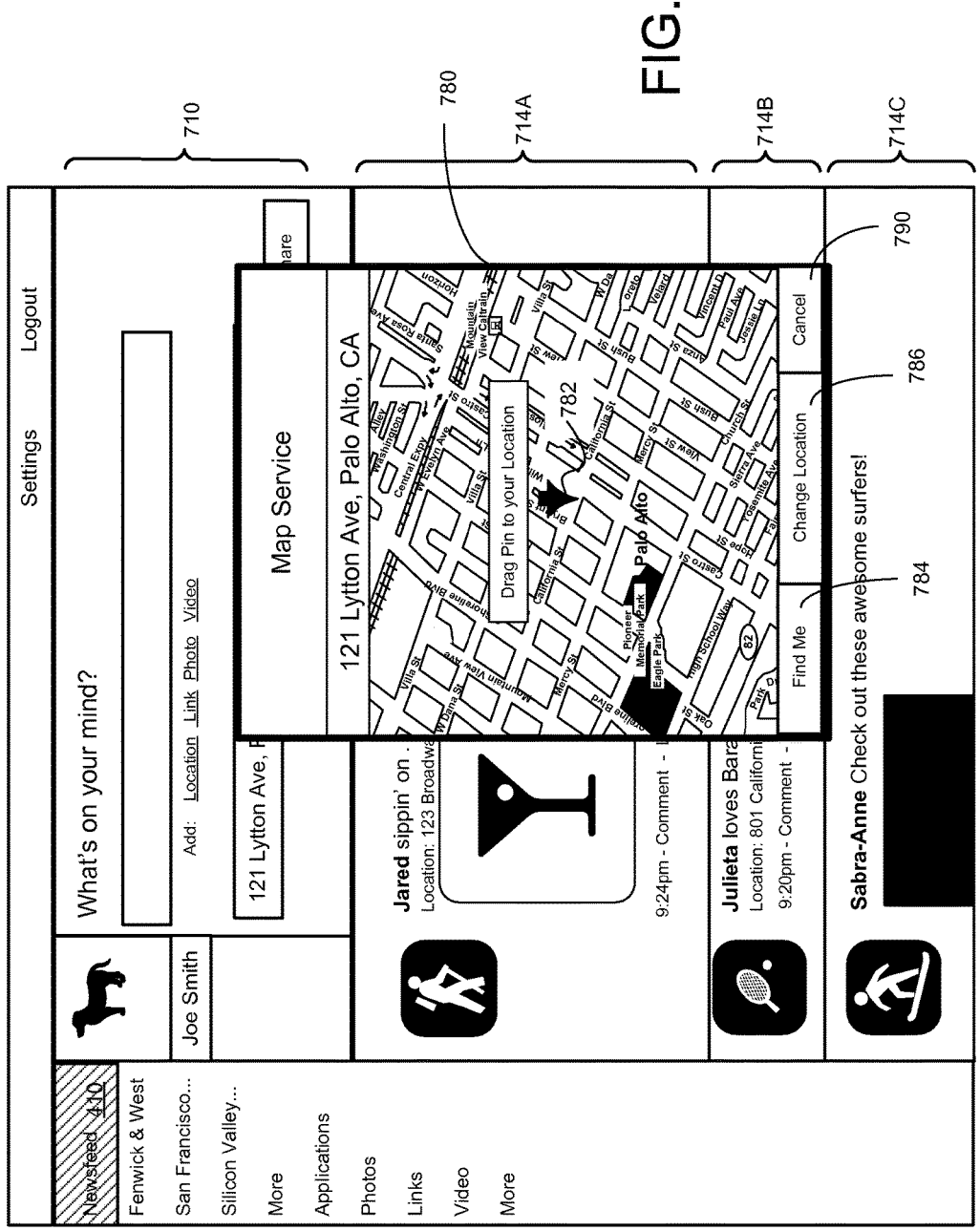

FIG. 7C is a user interface displayed after the user clicks the "Find on Map" button 776, according to one embodiment. The clicking of the "Find on Map" button 776 displays a popup window 780 in the user interface that allows the user to pinpoint a location. The user may move the arrow 782 in the popup window 780 to find the correct location. Alternatively, the user can use a "Find Me" button 784 to have the originating communication device or the social networking system 100 to detect the user's location. The user can revise the typed in location by clicking the "Change Location" button 786 in the popup window 780. The user may also close the popup window 780 by clicking the "cancel" button 790.

Figure 7D:
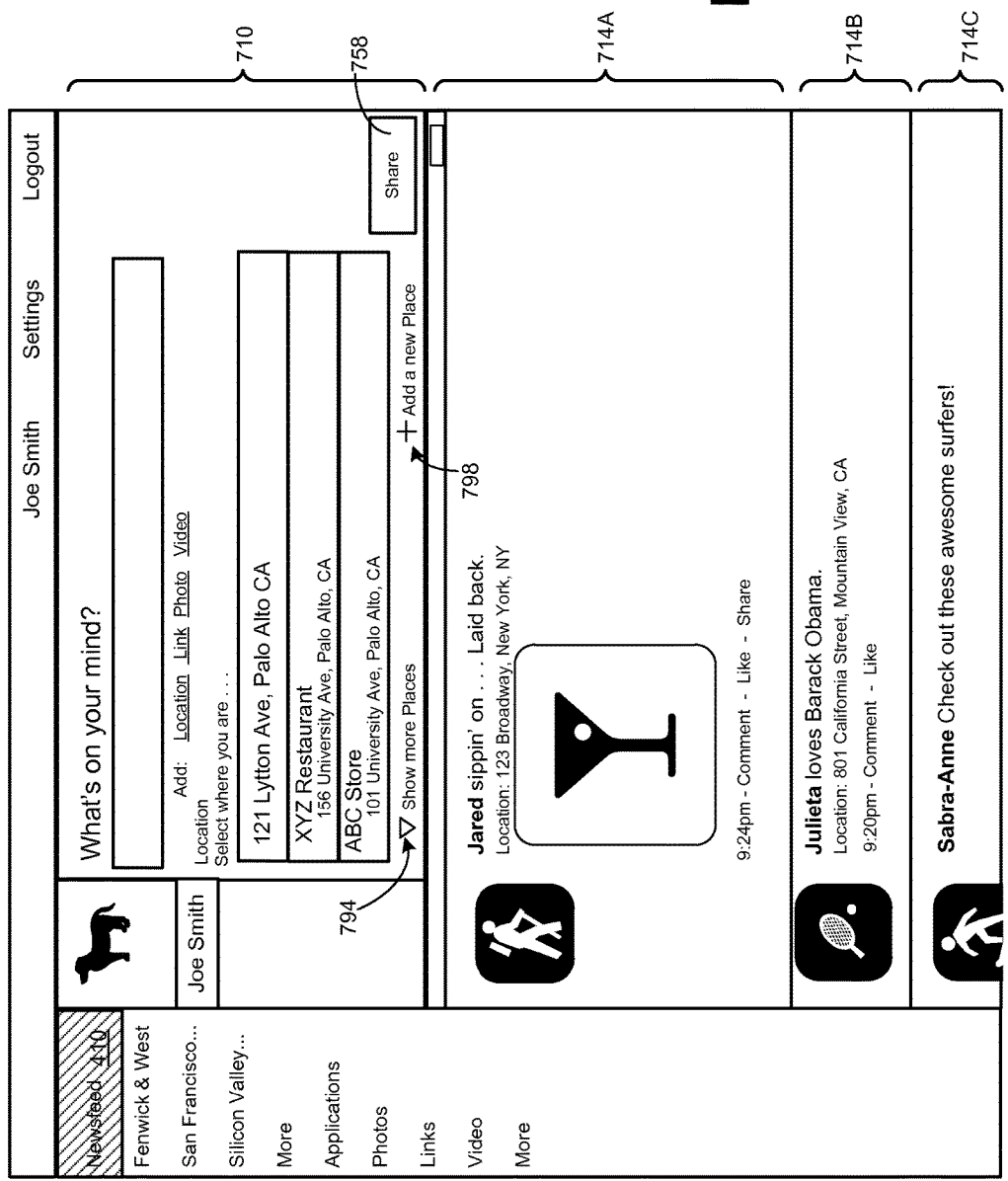

FIG. 7D is a user interface displayed after the user selects a location using the popup window 780, according to one embodiment. After the geographic location is determined, the social networking system 100 identifies the names of points of interest close to the location or at the location set by the user. In the example of FIG. 7D, "XYZ Restaurant" and "ABC Store" are displayed as being near or at the address provided by the user. The user may request display of additional points of interest close to the address by clicking "Show more Places" button 794 or add new places for current and future displaying by clicking the "Add a new Place" button 798. After the location associated with the content item is determined, the user clicks the "Share" button 758 to publish the content item and the location information.

Determining User Location

Figure 8:
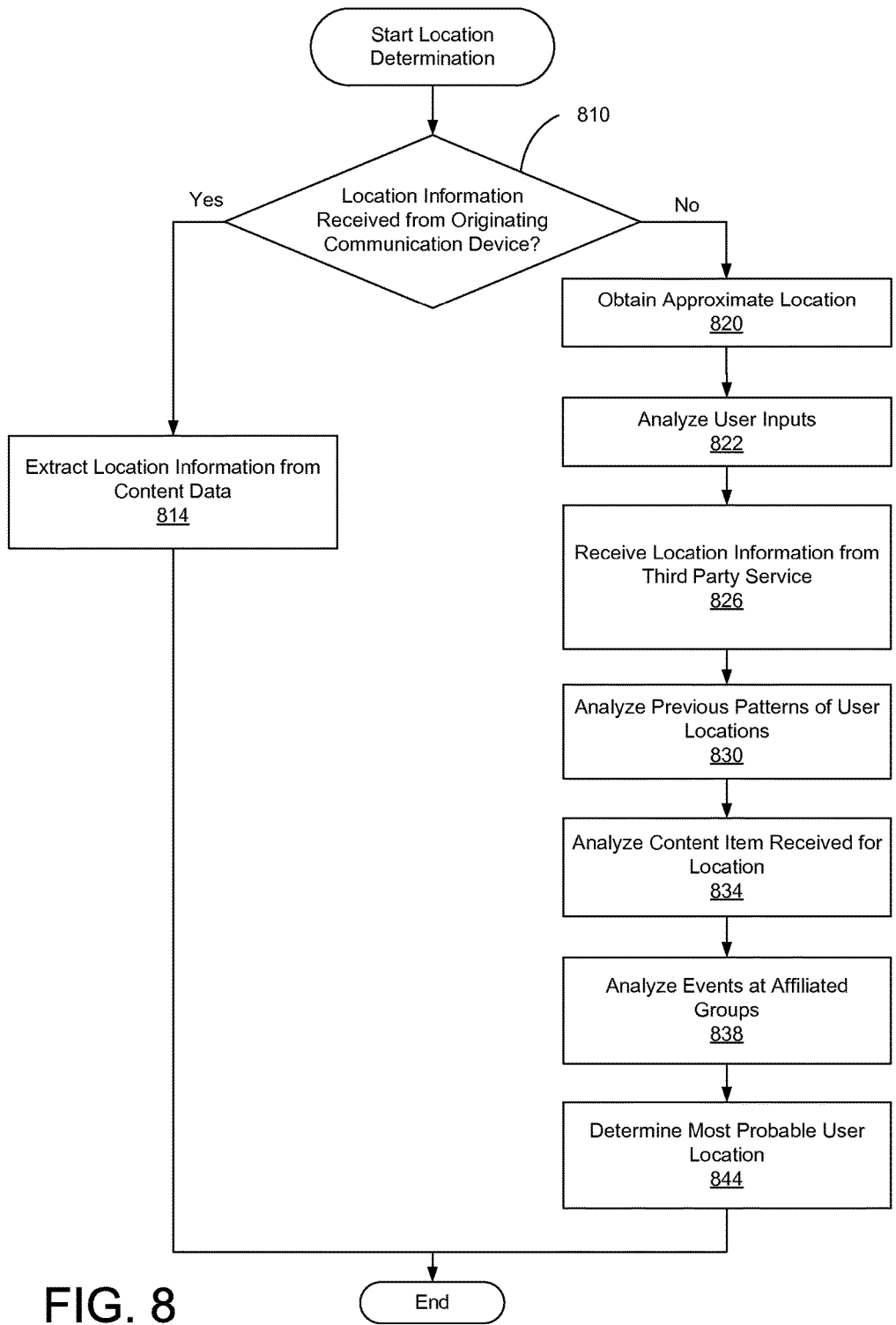
FIG. 8 is a flowchart illustrating a process of determining the location of a member, in accordance with one embodiment.

FIG. 8 is a flowchart illustrating the process of determining the location of a user, in accordance with one embodiment. First, it is determined 810 whether the location information is received 810 from the originating communication device 110. If the location information is received, it is extracted 814 from the content data. Then the process terminates.

If the location information is not received from the originating communication device 110, the location of the user is estimated based on the information available to the social networking system 100. Specifically, the approximate location of the user is obtained from the location approximation module 310 of the social networking system 100. The user input is analyzed 822 by the user input analyzer 410 to determine the most likely location of the user. The user input includes, for example, search queries on an Internet search engine. The location information is also received 826 at the third party service interface module 420 of the social networking system 100 from a third party service. The pattern of user's previous locations is analyzed 830 by the previous location tracker 430 of the social networking system to determine the most likely location of the user. The content item is also analyzed 834 by the content analyzer 440 to determine the location of the user. The events of groups affiliated with the user are also analyzed 836 by the user group activity tracker 450. Based on the results of some or all of these and/or other factors, the social networking system 100 determines 844 the most likely location of the user. Then the process terminates.

The steps illustrated in FIG. 9 are only illustrative and not restrictive. Only some of the steps illustrated in FIG. 8 may be performed to estimate the location of the user. Further, other information may be received or processed at the social networking system 100 to estimate the current location of the user.

Applicable Use of Content Items Tagged with Location Information

Content tagged with location information may be used to provide various location-based services to users of a social networking service. The social networking system 100 may filter and send the content item that is relevant to the current location of the user. As described above with reference to FIG. 7A, for example, the content item published by various users may be filtered based on the locations associated with the content item by clicking the location filtering button 766. Further, the content item may be prioritized and presented to the user based on the proximity of the locations associated with the content item.

The location-based services provided by the social networking service may also facilitate reviewing and rating of business establishments (e.g., restaurants) by users. The review and ratings of the services may be uploaded to the social networking system 100 as content items tagged with locations, and stored in the social networking system 100 for reference by other users.

The social networking system 100 may also provide advertisements or send promotional materials based on the location information received from the user. When the user uploads a content item associated with a location, the social networking system 100 may automatically send coupons or other promotional items to the user. Other users may also send coupons or other promotional items to the user sharing the location. The content item published by other users may be digital coupons that are tagged with location where the digital coupons can be used.

The location-based services provided by the social networking service may also allow a user to identify other users in the area. The social networking system 100 may filter recent content items to obtain a list of users in a certain geographic location. The user may then send emails, instant messages, or use messaging services provided by the social networking service to meet with other users. The user may also be automatically directed to or provided with directions to the location of other members. The user may also set up notifications within a specific geographic location to allow them to automatically be notified when other members are within that geographic location.

In one embodiment, the location-based services provided by the social networking service may also allow a user to find other objects in a certain geographic location, including, but not limited to, events, photos, videos, stories, documents, reviews, messages, and notes.

In one embodiment, the location-based services provided by the social networking service may also allow a user to dynamically generate lists of friends that can then be used as a filter on the content items being viewed.

In one embodiment, the location-based services allow a user to view a map of a specific geographic location that displays many object types, including other members, content items, events and others.

In one embodiment, the location-based services may allow a user to set up a schedule of geographic locations that the user will be travelling to and automatically update selected members when they arrive or leave each location through the social networking system.

Further, although embodiments of this disclosure are primarily described with respect to a user of a social networking service making a content item and location information accessible to other users of the social networking system, other embodiments may allow a user to make a content item and location information available to others who are not users of the social networking system.

Components of the originating communication device 110 and the social networking system 100 may be implemented in software, firmware, hardware or a combination thereof. The components implemented as software may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
   receiving information of a first user of a social networking service, the information comprising location information and activity information of one or more groups with which the first user is associated;
   determining a list of distinct locations where a first user is likely to be located based on the received location and activity information;
   sending the list of distinct locations to a communication device of the first user;
   receiving, from the communication device, a location selected by the first user among the list of distinct locations to indicate the location of the first user;
   retrieving information about public transport traveling from or through the selected location of the first user;
   determining an updated location of the first user based on the selected location and the information about the public transport;
   receiving, from the communication device, a content item, wherein the content item represents data posted by the first user and is transmitted from the communication device to the social networking service;
   labeling the content item with the updated location; and
   making the content item and the updated location available to a first viewing user at a first level of resolution and a second viewing user at a second level of resolution, the level of resolution based on the relationship of the viewing user to the first user.

2. The method of claim 1, wherein the list of distinct locations is determined further based on a user profile of the first user.

3. The method of claim 1, wherein the updated location is received simultaneously with the content item from the communication device.

4. The method of claim 1, further comprising receiving a signal from the communication device indicating that the first user is taking the public transport, the updated location determined responsive to receiving the signal.

5. The method of claim 1, further comprising determining the list of distinct locations based on an IP (Internet Protocol) address of the communication device.

6. The method of claim 1, wherein the updated location is sent to the second viewing user via at least one of an instant message, an email, a web document and a text message.

7. The method of claim 1, wherein the public transport comprises at least one of vehicles, vessels or airplanes.

8. The method of claim 1, further comprising:
analyzing a substance of the content item using content recognition tools;
determining whether the content indicates a location associated with the content item; and
responsive to the content item indicating a location, labeling the content item with the indicated location.

9. The method of claim 1, further comprising sharing the updated location only during a certain time period or when the first user is within a predefined geographic area.

10. A method comprising:
receiving information for a communication device associated with a respective user, the information comprising location information and activity information of one or more groups with which the user is associated;
for each respective user, determining a list of distinct locations where the respective user is likely to be located based on the received location and activity information;
for each respective user, sending the list of distinct locations to the communication device;
from each respective user, receiving a location selected by the respective user on the communication device among the list of distinct locations to indicate the location of the respective user;
retrieving information about public transport traveling from or through the selected location;
determining an updated location of the respective user based on the selected location and the information about the public transport;
determining whether to make the updated location available to a first requesting user and a second requesting user;
receiving, from the communication device, a content item, wherein the content item represents data posted by the respective user and is transmitted from the communication device to the social networking service;
labeling the content item with the updated location; and
making the content item and the updated location available to the first requesting user at a first resolution and to the second requesting user at a second resolution, the level of resolution based on the relationship of the requesting user to the respective user.

11. The method of claim 10, wherein the list of distinct locations is determined further based on a user profile of the respective user.

12. The method of claim 10, wherein the updated location is received simultaneously with the content item from the communication device.

13. The method of claim 10, further comprising further comprising receiving a signal from the communication device indicating that the respective user is taking the public transport, the updated location determined responsive to receiving the signal.

14. The method of claim 10, further comprising determining the list of distinct locations based on an IP (Internet Protocol) address of the communication device.

15. The method of claim 10, wherein the updated location is sent to the second requesting user via at least one of an instant message, an email, a web document and a text message.

16. The method of claim 10, wherein the public transport comprises at least one of vehicles, vessels or airplanes.

17. A non-transitory computer readable storage medium storing instructions thereon, the instructions when executed by a processor in a computing device, cause the processor to:
receiving information of a first user of a social networking service, the information comprising location information and activity information of one or more groups with which the first user is associated;
determining a list of distinct locations where a first user is likely to be located based on the received location and activity information;
sending the list of distinct locations to a communication device of the first user;
receiving, from the communication device, a location selected by the first user among the list of distinct locations to indicate the location of the first user;
retrieving information about public transport traveling from or through the selected location of the first user;
determining an updated location of the first user based on the selected location and the information about the public transport;
receiving, from the communication device, a content item;
labeling the content item with the updated location; and
making the content item and the updated location available to a first requesting user at a first resolution and to a second requesting user at a second resolution, the level of resolution based on the relationship of the requesting user to the first user.

18. The non-transitory computer readable storage medium of claim 17, wherein the list of distinct locations is determined further based on a user profile of the first user.

19. The non-transitory computer readable storage medium of claim 17, wherein the instructions further cause the processor to receive a signal from the communication device indicating that the first user is taking the public transport, the updated location determined responsive to receiving the signal.

* * * * *